United States Patent [19]
Dezael et al.

[11] Patent Number: 6,165,436
[45] Date of Patent: Dec. 26, 2000

[54] HIGH-PRESSURE SULFUR RECOVERY PROCESS

[75] Inventors: Claude Dezael, Maison Lafitte; Fabrice Lecomte, Rueil-Malmaison; Jacques Queyrel, Chatou, all of France

[73] Assignees: Institut Francais du Petrole; Le Gaz Integral, both of Cedex, France

[21] Appl. No.: 09/206,162

[22] Filed: Dec. 7, 1998

[30] Foreign Application Priority Data

Dec. 5, 1997 [FR] France .................................. 97 15520

[51] Int. Cl.$^7$ ...................................................... C10L 3/10
[52] U.S. Cl. ...................................... 423/576.4; 423/576.5; 423/576.6; 423/576.7; 48/127.7
[58] Field of Search ............................. 423/576.5, 576.6, 423/576.7, 576.4; 48/127.7

[56] References Cited

U.S. PATENT DOCUMENTS

| | | | |
|---|---|---|---|
| 4,011,304 | 3/1977 | Mancini et al. | 423/573 G |
| 4,859,437 | 8/1989 | Grinstead et al. | 423/226 |
| 5,096,691 | 3/1992 | Bedell et al. | 423/576.6 |

FOREIGN PATENT DOCUMENTS

| | | | |
|---|---|---|---|
| 0227291A1 | 7/1987 | European Pat. Off. | F03G 7/04 |
| 0409480A2 | 1/1991 | European Pat. Off. | B01D 53/34 |
| 4326032A1 | 2/1995 | Germany | B01D 53/52 |

OTHER PUBLICATIONS

Kohl et al. "Gas Purification" 4th Edition, Gulf Publishing Co. Houston TX ISBN 0–87201–314–6, pp. 515–517, 1985.

Special Report: "Gas Process Handbook '92: Sulferox", Hydrocarbons Processing, vol. 71, No. 4, Apr. 1992, p. 134.

*Primary Examiner*—Steven P. Griffin
*Assistant Examiner*—Timothy C Vanoy
*Attorney, Agent, or Firm*—Antonelli, Terry, Stout & Kraus, LLP

[57] ABSTRACT

A process is provided for removing hydrogen sulfide out of a gas, such as natural gas. The hydrogen sulfide contaminated gas is contacted with a catalytic aqueous solution containing a polyvalent metal chelating agent under conditions in which the hydrogen sulfide is oxidized into elemental sulfur and the polyvalent metal chelating agent is reduced to a lower oxidation state, and the treated gas is recovered. The solution containing the polyvalent metal chelating agent and the elemental sulfur is filtered at a pressure of at least 1 Mpascals. At least a portion of the filtered solution containing the polyvalent metal chelating agent is degassed and/or depressurized for the removal of components such as light hydrocarbons and carbon dioxide; contacted with an oxidizing agent and recycled back to the hydrogen sulfide removal step. By filtering the sulfur out of the solution at a pressure of at least 1 Mpascal, foam formation and clogging problems can be avoided.

23 Claims, 2 Drawing Sheets

HIGH-PRESSURE SULFUR RECOVERY PROCESS

BACKGROUND OF THE INVENTION

1. Field of the Invention

The present invention relates to a process for desulfurizing an acid gas containing at least hydrogen sulfide ($H_2S$) where the sulfur recovery stage is carried out at high pressure.

2. Description of the Prior Art

The prior art describes many redox processes and devices allowing removal of the hydrogen sulfide and recovery of the elementary sulfur formed during the process.

In general, it is well-known to contact the solution containing the elementary sulfur with air at atmospheric pressure and to recover the sulfur by flotation and/or decantation. When the gas to be desulfurized is at high pressure, a preliminary stage of expansion of the catalytic solution containing the sulfur is necessary so that it can be reoxidized in air. This expansion brings about degassing of the solution, which generally leads to foaming and clogging problems.

SUMMARY OF THE INVENTION

The process according to the invention proposes a new sulfur recovery approach which notably has the advantage of preventing foam formation and the resulting clogging problems, and of minimizing the energy consumption required for recompression of the regenerated catalytic solution.

The process according to the invention is notably applied for recovery of the elementary sulfur produced during a redox process for desulfurizing a gas containing at least $H_2S$. A catalytic solution containing at least one polyvalent metal chelated by at least one chelating agent is used during this process under suitable conditions in order to perform oxidation of the hydrogen sulfide to elementary sulfur and simultaneous reduction of the polyvalent metal from a higher oxidation level to a lower oxidation level. A substantially hydrogen sulfide-free gaseous effluent is recovered on the one hand and, on the other hand, the catalytic aqueous solution, at least partly reduced, containing elementary sulfur in the form of a suspended solid is recovered. This solution must then be processed in order to separate the sulfur and to recover the solution.

In the description hereafter, the expression <<high pressure>> refers to a stage where the pressure is at least above 1 MPa and <<low pressure>> refers to a stage carried out at a pressure close to the atmospheric pressure.

The present invention relates to a process for desulfurizing a gaseous feed containing hydrogen sulfide.

The present invention comprises for example the successive stages as follows:

a) the gaseous feed is contacted with a catalytic aqueous solution comprising at least one polyvalent metal chelated by at least one chelating agent, under suitable conditions for oxidation of the hydrogen sulfide to elementary sulfur and concomitant reduction of the polyvalent metal from a higher oxidation level to a lower oxidation level, and a substantially hydrogen sulfide-free gaseous effluent is recovered on the one hand and, on the other hand, the catalytic aqueous phase at least reduced and containing elementary sulfur, b) the elementary sulfur is separated from said reduced catalytic aqueous phase by filtering prior to sending at least part of the reduced catalytic aqueous phase depleted in sulfur to a degassing and/or depressurizing stage, c) after the separation of the elementary sulfur by filtering, degassing and/or depressurizing at least part of the reduced catalytic aqueous phase, d) the regenerating degassed at least part of the reduced catalytic aqueous phase, and e) recycling at least part of the regenerated catalytic aqueous phase to contact the gaseous feed.

According to an embodiment of the process, the reduced aqueous solution depleted of sulfur is separated into a major fraction F1 and a minor fraction F2 prior to carrying out degassing and/or depressurizing the reduced aqueous phase, and the major fraction is recycled prior to expansion to the gaseous feed being contacted with the catalytic aqueous solution.

The potential of the reduced aqueous solution is for example measured prior to separation and fractions F1 and F2 are so determined that the ratio of the ferric ions to the ferrous ions is maintained substantially equal to 20.

The separation can be carried out at a pressure ranging between 0.1 and 20 MPa, preferably between 1 and 10 MPa.

Air can be used as the oxidizing agent for the regeneration stage.

The aqueous solution can be a chelated iron catalytic solution produced from ferrous or ferric iron such as nitrates, thiosulfate, chloride, acetate, oxalate, phosphates, ferric ammonium oxalate, ferric potassium oxalate, etc.

Chelating agents can be used alone or in admixture, such as organic compounds known for their complexing properties, for example acetylacetone, citric acid, salicylic acid, sulfosalicylic acid, tiron (catechodisulfonic acid), dimercapto-2-3-propanol and amino-acids, for example EDTA (ethylenediaminetetraacetic acid), HEDTA (hydroxy-2-ethylenediaminetriacetic acid), NTA (nitrilotriacetic acid), DCTA (diamino-1-2-cyclohexanetetraacetic acid), DPTA (diethylenetriaminepentaacetic acid), IDA (iminodiacetic acid).

According to an embodiment of the process, the absorption stage is carried out by cocurrent circulation of the gas to be processed and of the catalytic solution in a single chamber, and the scrubbed gas is separated from the reduced solution prior to the sulfur separation stage.

According to another embodiment, the absorption stage is carried out for example by cocurrent circulation of the gas to be processed and of the catalytic solution in a single chamber, and the scrubbed gas is separated from the reduced solution after the sulfur separation stage.

The process is for example applied for desulfurization of a natural gas.

BRIEF DESCRIPTION OF THE DRAWINGS

Other features and advantages of the process according to the invention will be clear from reading the description hereafter of embodiments given by way of non limitative examples, with reference to the accompanying drawings wherein.

DETAILED DESCRIPTION OF THE INVENTION

In order to illustrate the stages of the process according to the invention, the examples hereafter are given for desulfurization processes using a catalytic solution comprising at least one polyvalent metal chelated by at least one chelating agent in order to perform oxidation of the hydrogen sulfide to elementary sulfur and concomitant reduction of the polyvalent metal from a higher oxidation level to a lower oxidation level. After these processes are over, a gaseous effluent depleted in hydrogen sulfide is recovered on the one hand and, on the other hand, the catalytic aqueous solution at least reduced and containing elementary sulfur.

The desulfurization process can comprise the two oxidation-reduction stages as follows in a first stage, the $H_2S$ present in the gas to be processed reacts with chelated ferric ions according to the reaction

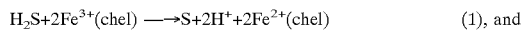

$$H_2S + 2Fe^{3+}(chel) \longrightarrow S + 2H^+ + 2Fe^{2+}(chel) \qquad (1), \text{ and}$$

in a second stage (regeneration stage), the ferric ions obtained are reoxidized by air according to the reaction

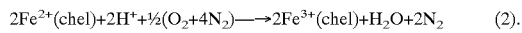

$$2Fe^{2+}(chel) + 2H^+ + \tfrac{1}{2}(O_2 + 4N_2) \longrightarrow 2Fe^{3+}(chel) + H_2O + 2N_2 \qquad (2).$$

Removal of the hydrogen sulfide from the gas is usually performed by scrubbing the gas by means of ferric and possibly ferrous iron solutions (catalytic solutions), the ferric and ferrous ions being complexed by suitable chelating agents such as polycarboxylic amino-acids. One of the following acids can be used: acetylacetone, citric acid, salicylic acid, sulfosalicylic acid, tiron (catechodisulfonic acid), dimercapto-2-3-propanol and amino-acids, for example EDTA (ethylenediaminetetraacetic acid), HEDTA (hydroxy-2-ethylenediaminetriacetic acid), NTA (nitriloacetic acid), DCTA (diamino-1,2-cyclohexanetetraacetic acid), DPTA (diethylenetriaminepentaacetic acid), IDA (iminodiacetic acid). These acids can be used alone or mixed together.

Figure 1:
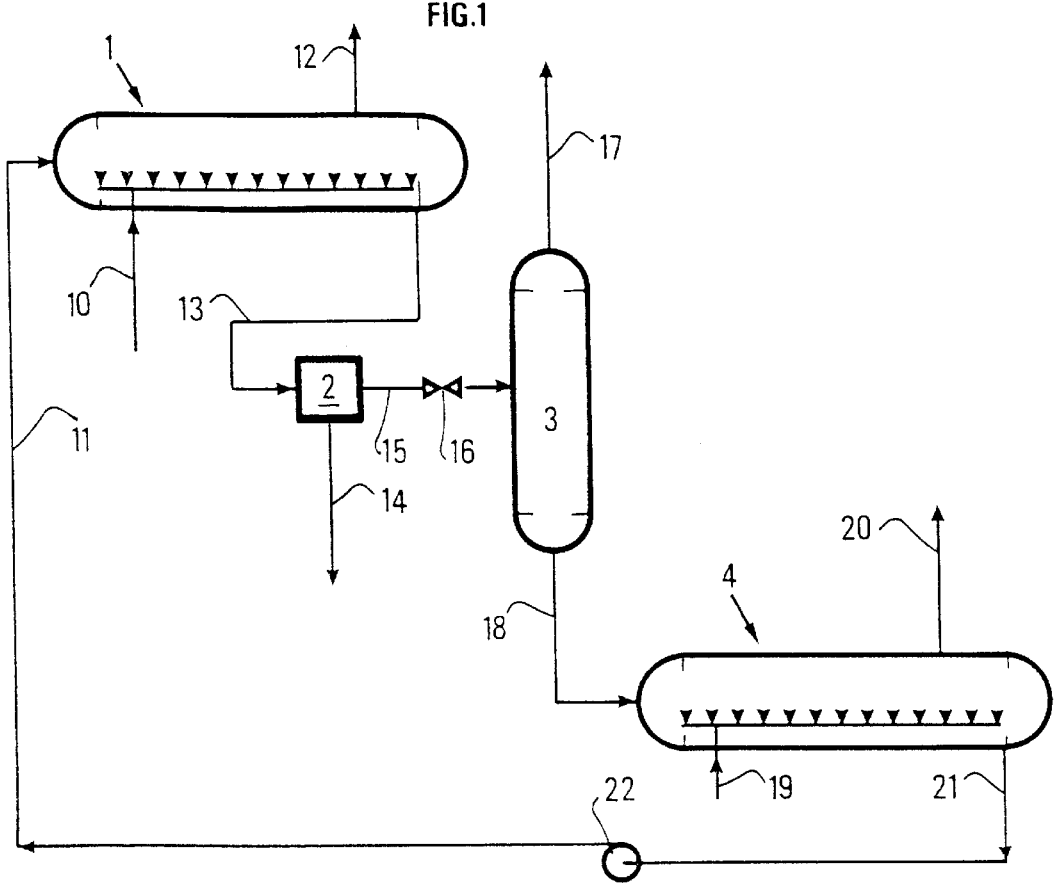
FIG. 1 diagrammatically shows a layout of the devices required for implementation of the process according to the invention, FIG. 2 partially shows a variant of the process of FIG. 1 where part of the catalytic solution is recycled prior to expansion, and FIG. 3 diagrammatically shows another embodiment where the gas to be processed is contacted cocurrent with a catalytic solution.

The device for implementing the process according to the invention that is described in FIG. 1 comprises a chamber 1 for contacting the gas to be processed with the catalytic solution, where the oxidation reduction according to reaction (1) is carried out, a device 2 for separating the elementary sulfur produced, a flash zone 3 and a chamber 4 for regeneration of the catalytic solution.

The contact chamber or absorber 1 is equipped with a line 10 delivering the gas to be processed, a line 11 allowing delivery of the catalytic solution, a line 12 intended for discharge of the gas freed from at least most of the hydrogen sulfide contained therein a line 13 intended for discharge of a solution comprising the reduced catalytic solution and the elementary sulfur produced during oxidation-reduction reaction (1).

Line 13 is connected to sulfur separation device 2 which can consist of a filter suited for high-pressure separation. The separation device is situated, under standard operating conditions, before the expansion device mentioned hereafter. At the outlet of filter 2, the separated elementary sulfur is discharged through a line 14, whereas the reduced solution freed from most of the elementary sulfur is sent to an expansion device 16, a valve for example, through a line 15. This expansion causes degassing of the gases dissolved in the reduced solution at high pressure and possibly of the sulfur-containing organic products.

The mixture of reduced and expanded catalytic solution and of the gases produced by degassing is fed into a flash drum 3. The gases produced during degassing, mainly light hydrocarbons, $CO_2$, are recovered through a line 17 at the top of flash drum 3 and the reduced and degassed catalytic solution is recovered through a line 18 at the bottom of the drum.

This reduced and degassed catalytic solution is sent to regeneration chamber 4, such as an oxidation reactor, which is provided with a line 19 delivering an oxidizing agent such as air, with a line 20 intended for discharge of the excess air that has not reacted, and with a line 21 allowing discharge of the regenerated catalytic solution. This regenerated catalytic solution can thereafter be sent to a pump 22 and recycled through line 11 to contact chamber 1.

Sulfur separation at high pressure according to the process of the invention advantageously allows to avoid problems linked with the formation of foam during sulfur recovery according to the patterns of the prior art at low pressure and with the clogging of the devices used for implementing the process.

The separation stage is for example carried out by means of a high-pressure filter such as that described in U.S. Pat. No. 5,435,911.

The device suited for sulfur separation comprises for example filter cartridges on which the elementary sulfur particles deposit. It can comprise for example several filtering units working alternately. The deposited sulfur is then recovered by declogging of the cartridges by means of a liquid (wet declogging) or gaseous (dry declogging) countercurrent. During the declogging operation, the unit concerned does not act as a filter and the solution continues to be filtered on the other units. The sulfur is recovered in the form of a cake or of a concentrated solution.

The filtering device is selected to work at a pressure value ranging between 0.1 and 20 MPa, preferably between 1 and 10 MPa.

The object of the example given hereafter is to allow better understanding of the process according to the invention and of the advantages thereof.

EXAMPLE 1

A gas containing methane, 5% $CO_2$, 5000 vol. ppm $H_2S$ and 30 vol. ppm $CH_3SH$ is fed into absorber 1 through line 10. In absorber 1, it is contacted with an aqueous catalytic solution containing iron in 0.05 mole/l proportions and nitriloacetic acid used as a complexing agent in 0.11 mole/l proportions.

The gas is introduced at a flow rate of the order of 10,000 $Nm^3/h$ and the aqueous catalytic solution at a flow rate of approximately 90 $m^3/h$.

After this oxidation-reduction stage according to reaction (1), a scrubbed gas containing 10 vol. ppm $H_2S$ and 15 vol. ppm $CH_3SH$ is recovered through line 12, as well as a reduced aqueous catalytic solution containing elementary sulfur at a concentration of about 0.8 g/l.

The pressure in the absorber can range between 0.1 and 20 MPa, and it is preferably in the 3 to 12 MPa range. The temperature value ranges for example between 10 and 40° C., and it is preferably substantially equal to the ambient temperature.

The elementary sulfur is separated from the reduced aqueous solution in filter 2 at a pressure substantially equal to 8 MPa, the amount of sulfur recovered being about 70 kg/hour.

At the filter outlet, the reduced aqueous solution is at a pressure of approximately 7.6 MPa and, after expansion through valve 16, at a pressure substantially close to the atmospheric pressure.

The sulfur-freed and expanded aqueous solution is sent to a flash stage where the dissolved gases are removed, mainly the light hydrocarbons, $CO_2$, sulfur-containing organic products which are discharged through line 17. The gas recovered through line 17 comprises 42% methane, 3% water, 300 vol. ppm $CH_3SH$ and 55% $CO_2O$.

The degassed reduced aqueous solution discharged through line 18 is sent to the regeneration stage which is carried out at atmospheric pressure and at a temperature close to the ambient temperature. Air is therefore introduced through line 19 in sufficient amount for the oxygen contained to allow oxidation of the ferrous ions of the reduced catalytic solution into ferric ions. The ferrous ions are reoxidized according to oxidation-reduction reaction (2) so as to produce a regenerated catalytic solution. The regenerated catalytic solution is then sent to pump 22 where the pressure of the solution is raised from atmospheric pressure to a pressure of 8 MPa, and recycled to absorber 1.

The air is introduced at a flow rate of 3,000 $Nm^3/h$.

Figure 2:
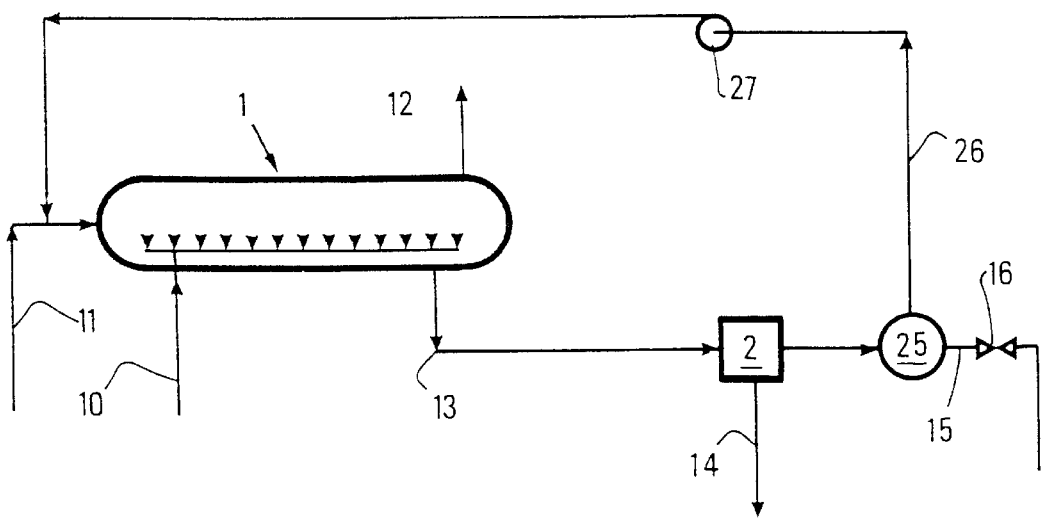

FIG. 2 diagrammatically shows an advantageous variant of the process which notably has the advantage of minimizing the energy consumed during the stage of recompression of the regenerated catalytic solution.

It is particularly well-suited when the catalytic solution is little reduced after the oxidation stage according to reaction (1). It is notably applied when the ratio of the flow rate of the ferric ions present in the catalytic solution to the flow rate of the hydrogen sulfide is relatively high and at least above 10.

In comparison with the diagram of FIG. 1, this embodiment comprises a device 25 allowing the sulfur-depleted and reduced catalytic solution coming from separation device 2 to be fractionated into a major fraction F1 and a minor fraction F2.

Major fraction F1 is sent through a line 26 and a pump 27 to the inlet of absorber 1 without being expanded through expansion valve 16. This fraction is mixed with the regenerated catalytic solution that flows in through line 11.

Minor fraction F2 flows through line 15, it is expanded through valve 16 and sent to the regeneration stage.

At the level of separation device 25, it is possible to place a means allowing measurement of the potential of the reduced catalytic solution and to control the proportions of fractions F1 and F2 by acting on valve 16.

Such a procedure advantageously allows avoiding expansion of all the regenerated catalytic solution and thus to minimize the required recompression energy provided in recycling pump 22 (FIG. 1).

EXAMPLE 2

A gas containing methane, 3 vol. % $CO_2$, 50 vol. ppm $H_2S$ and 10 ppm $CH_3SH$ is fed into the absorber through line 10 at a flow rate of the order of 5,000 $Nm^3/h$.

It is contacted with an aqueous catalytic solution containing iron at a concentration of 0.25 mole/l and NTA at a concentration of 0.5 mole/l, the flow rate of the solution being 15 $m^3/h$.

As in example 1, a scrubbed gas containing 2 ppm $H_2S$ and 5 ppm $CH_3SH$ is recovered, as well as a partly reduced catalytic solution containing elementary sulfur at a concentration of approximately $2.5 \cdot 10^{-2}$ g/l.

The operating pressure and temperature conditions are for example identical to those given in example 1.

About 375 g/h of sulfur is recovered at the outlet of filtering device 2.

The partly reduced catalytic solution which contains practically no more sulfur is separated into two fractions:
 a major fraction F1, about 13.5 m/h, which is sent back to contact chamber 1 without being expanded through expansion valve 16,
 a minor fraction F2, about 1.5 $m^3/h$, which is expanded through valve 16 to a pressure substantially equal to the atmospheric pressure and which is thereafter sent to the regeneration stage.

It is possible to control fractions F1 and F2 after measuring the potential of the catalytic solution after the filtering stage in order to maintain the $Fe^{3+}/Fe^{2+}$ ratio substantially equal to 20.

The gas recovered after the flash stage contains about 35 vol. % $CO_2$ and 100 ppm $CH_3SH$, 62% methane and 3% water.

The regenerated catalytic solution fraction F2 can be recycled to the absorber as in the example given in FIG. 1. The flow rate of the air introduced for the regeneration stage is about 15 $Nm^3/h$.

Figure 3:
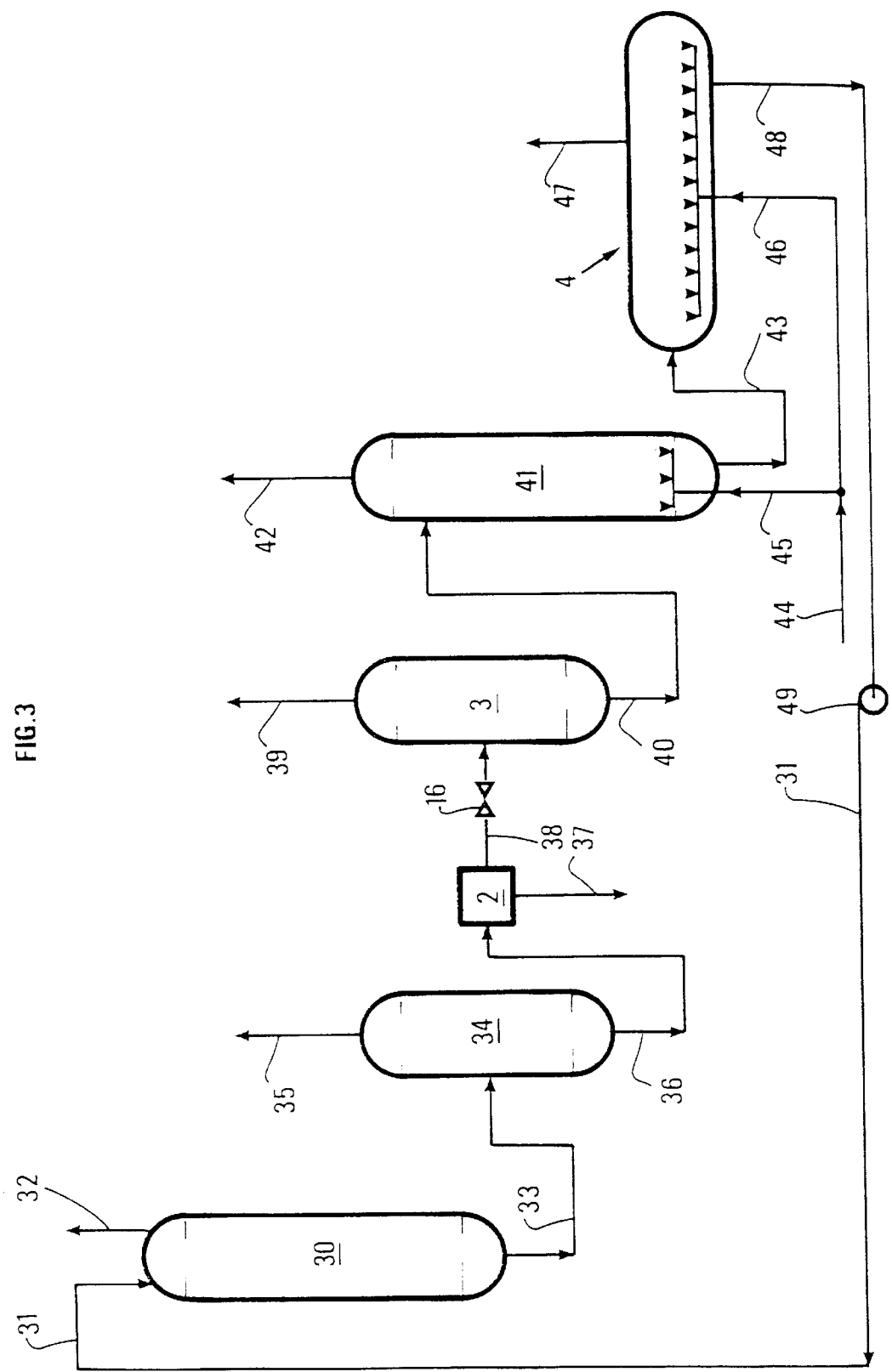

FIG. 3 diagrammatically shows a variant of the process according to the invention where the absorption stage (oxidation-reduction reaction according to pattern (1)) is carried out by cocurrent circulation of the gas and of the catalytic solution.

The absorption zone or chamber 1 (FIG. 1) therefore comprises a column 30 suited for cocurrent operation. Column 30 is provided, in the upper part thereof, with at least one line 31 allowing introduction of the catalytic solution, at least one line 32 intended for delivery of the gas to be processed, and in the lower part thereof with a line 33 for discharge of a mixture consisting of the gas freed from at least most of the sulfur, the catalytic solution reduced after oxidation-reduction reaction (1) and elementary sulfur produced during this oxidation-reduction reaction. The mixture can occur as an emulsion.

Line 33 is connected to a high-pressure flash drum 34 at the outlet of which the scrubbed gas is discharged through a line 35 at the top and a mixture consisting of the reduced catalytic solution and elementary sulfur is discharged through a line 36 at the bottom of the flash drum.

This mixture is sent to separation device 2 at the outlet of which the sulfur is discharged through a line 37 for example at the bottom, whereas the reduced catalytic solution is sent through a line 38 to the expansion stage through valve 16. The reduced and expanded solution is fed into a low-pressure flash drum 3 (approximately atmospheric pressure) which allows removal of the gases produced during expansion that are discharged at the top of the flash drum through a line 39. The reduced catalytic solution is sent through a line 40 to a complementary stripping stage, line 40 opening preferably into the upper part of a stripping column 41.

Stripping column 41 comprises, in the lower part thereof for example, a line 45 allowing delivery of a stripping gas such as air. The line can be a bypass of a main air delivery line 44 for regenerating the reduced catalytic solution.

The stripping gas is discharged at the top of the stripping column, through a line 42, together with the gases dissolved in the catalytic solution, such as the hydrocarbons $CH_4$, the BTX, the $CO_2$, the sulfur-containing organic molecules, and the reduced and stripped catalytic solution is discharged at the bottom of the stripping column through a line 43.

This reduced solution is then sent to the regeneration stage, fed into regeneration drum 4 through line 43, oxidized and regenerated with part of the air introduced through a line 46, which can be a bypass of line 44. The excess air that has not been used during the oxidation-reduction reaction according to equation (2) is discharged at the top of the drum through a line 47, whereas the regenerated catalytic solution is withdrawn at the bottom of the drum through a line 48 and brought to a pressure substantially identical to that of absorber 30 by a pump 49.

The operating pressure, temperature, gas and catalytic solution injection rate conditions are identical to those mentioned in one of the two previous examples. The results in terms of recovered amounts also correspond.

The air used in the stripping column is introduced at a flow rate close to 200 m³/h.

Without departing from the scope of the invention, it is possible to position sulfur separation unit 2 before the high-pressure flash drum.

This method of implementation advantageously allows increasing of the amount of dissolved gases that are recovered, and the gases coming from lines 39 and 42 can be combined for use as fuel gas.

Without departing from the scope of the invention, the process according to the invention can also be applied in other processes or by using other equipments. For example, it is possible to carry out simultaneously the absorption stage and the stage of high-pressure separation of the sulfur produced during oxidation-reduction reaction (1).

What is claimed is:

1. A process for desulfurizing a gaseous feed containing hydrogen sulfide comprising:
   a) contacting the gaseous feed with a catalytic aqueous solution comprising at least one polyvalent metal chelated by at least one chelating agent, under suitable conditions for oxidation of the hydrogen sulfide to elemental sulfur and concomitant reduction of the polyvalent metal from a higher oxidation level to a lower oxidation level, and recovering a gaseous effluent substantially freed from hydrogen sulfide and, at least reducing an oxidation state of the polyvalent metal of the catalytic aqueous phase which contains the elemental sulfur;
   b) separating the elemental sulfur from the reduced catalytic aqueous phase by filtering the sulfur at a pressure of at least 1.0 MPa;
   c) after the separation of the elemental sulfur by filtering, degassing and/or depressurizing at least a portion of the reduced catalytic aqueous phase;
   d) regenerating the degassed and/or depressurized at least a portion of the reduced catalytic aqueous phase by contact with an oxidizing agent; and
   e) recycling at least a portion of the regenerated catalytic aqueous phase to contact the gaseous feed.

2. A process as claimed in claim 1, further comprising:
   separating the reduced and sulfur-depleted aqueous solution into a major fraction F1 and a minor fraction F2 prior to the degassing and/or depressurization and recycling the major fraction without expansion to contact the gaseous feed.

3. A process as claimed in claim 2, further comprising:
   measuring a potential of the reduced aqueous solution before separation.

4. A process as claimed in claim 3, wherein:
   step b) is achieved at a pressure ranging between 1.0 and 20 MPa.

5. A process as claimed in claim 4, further comprising:
   separating the elemental sulfur at a pressure ranging between 1 and 10 MPa.

6. A process as claimed in claim 3, further comprising:
   using air as the oxidizing agent during regeneration.

7. A process as claimed in claim 3, wherein chelating agents are used alone or in admixture, selected from the group consisting of acetyl acetone, citric acid, salicylic acid, sulfosalicylic acid, tiron (catechodisulfonic acid), dimercapto-2-3-propanol and amino-acids, selected from the group consisting of EDTA (ethylenediaminetetraacetic acid), HEDTA (hydroxy-2-ethylenediaminetriacetic acid), DPTA (diethylenetriaminepentaacetic acid), and IDA (iminodacetic acid).

8. A process as claimed in claim 2, wherein:
   step b) is achieved at a pressure ranging between 1.0 and 20 MPa.

9. A process as claimed in claim 8, wherein:
   separating the elemental sulfur at a pressure ranging between 1 and 10 MPa.

10. A process as claimed in claim 8, wherein chelating agents are used alone or in admixture, selected from the group consisting of acetyl acetone, citric acid, salicylic acid, sulfosalicylic acid, tiron (catechodisulfonic acid), dimercapto-2-3-propanol and amino-acids, selected from the group consisting of EDTA (ethylenediaminetetraacetic acid), HEDTA (hydroxy-2-ethylenediaminetriacetic acid), DPTA (diethylenetriaminepentaacetic acid), and IDA (iminodacetic acid).

11. A process as claimed in claim 2, further comprising:
    using air as the oxidizing agent during regeneration.

12. A process as claimed in claim 2, wherein chelating agents are used alone or in admixture, selected from the group consisting of acetyl acetone, citric acid, salicylic acid, sulfosalicylic acid, tiron (catechodisulfonic acid), dimercapto-2-3-propanol and amino-acids, selected from the group consisting of EDTA (ethylenediaminetetraacetic acid), HEDTA (hydroxy-2-ethylenediaminetriacetic acid), DPTA (diethylenetriaminepentaacetic acid), and IDA (iminodacetic acid).

13. A process as claimed in claim 1, wherein:
    step b) is achieved at a pressure ranging between 1.0 and 20 MPa.

14. A process as claimed in claim 13, further comprising:
    separating the elemental sulfur at a pressure ranging between 1 and 10 MPa.

15. A process as claimed in claim 14, further comprising:
    using air as the oxidizing agent during regeneration.

16. A process as claimed in claim 14, wherein chelating agents are used alone or in admixture, selected from the group consisting of acetyl acetone, citric acid, salicylic acid, sulfosalicylic acid, tiron (catechodisulfonic acid), dimercapto-2-3-propanol and amino-acids, selected from the group consisting of EDTA (ethylenediaminetetraacetic acid), HEDTA (hydroxy-2-ethylenediaminetriacetic acid), DPTA (diethylenetriaminepentaacetic acid), and IDA (iminodacetic acid).

17. A process as claimed in claim 13, further comprising:
    using air as the oxidizing agent during regeneration.

18. A process as claimed in claim 13, wherein chelating agents are used alone or in admixture, selected from the group consisting of acetyl acetone, citric acid, salicylic acid, sulfosalicylic acid, tiron (catechodisulfonic acid), dimercapto-2-3-propanol and amino-acids, selected from the group consisting of EDTA (ethylenediaminetetraacetic acid), HEDTA (hydroxy-2-ethylenediaminetriacetic acid), DPTA (diethylenetriaminepentaacetic acid), and IDA (iminodacetic acid).

19. A process as claimed in claim 1, further comprising: using air as the oxidizing agent during regeneration.

20. A process as claimed in claim 1, wherein chelating agents are used alone or in admixture, selected from the group consisting of acetyl acetone, citric acid, salicylic acid, sulfosalicylic acid, tiron (catechodisulfonic acid), dimercapto-2-3-propanol and amino-acids, selected from the group consisting of EDTA (ethylenediaminetetraacetic acid), HEDTA (hydroxy-2-ethylenediaminetriacetic acid), DPTA (diethylenetriaminepentaacetic acid), and IDA (iminodacetic acid).

21. A process as claimed in claim 1, wherein absorption is carried out by concurrent circulation of a gas to be processed and of the catalytic aqueous solution in a single chamber, and a scrubbed gas is separated from the reduced aqueous phase prior to the sulfur separation.

22. A process as claimed in claim 1, wherein absorption is carried out by concurrent circulation of gas to be processed and of the catalytic aqueous solution in a single chamber, and the scrubbed gas is separated from the reduced aqueous phase after the sulfur separation.

23. A process according to claim 1, wherein the gaseous feed containing hydrogen sulfide is natural gas.

\* \* \* \* \*